Patented Feb. 7, 1950

2,496,786

UNITED STATES PATENT OFFICE 2,496,786

PROCESS FOR THE PREPARATION OF RING ACYLATED AROMATIC COMPOUNDS

Robert Everett Foster, New Castle, Del., assignor to E. I. du Pont de Nemours & Company, Wilmington, Del., a corporation of Delaware No Drawing. Application May 18, 1948, Serial No. 27,820

8 Claims. (Cl. 260—329)

This invention relates to organic chemistry and more particularly to the acylation of compounds having an aromatic nucleus.

The ring acylation of aromatic compounds has hitherto been carried out with the assistance of catalysts such as aluminum chloride, zinc chloride, iodine, hydroiodic acid, silica alumina gel, etc. These catalysts are uneconomical in that they are required in relatively high proportions to the aromatic compounds being acylated and some of them, notably aluminum chloride, are destructive to certain sensitive compounds such as furan. Moreover, acylation reactions employing these catalysts are almost invariably accompanied by substantial amounts of tarry residues.

This invention has as an object the provision of a process whereby the formation of tarry residues in acylation is decreased. A further object is the provision of a catalyst useful in much smaller proportions than hitherto employed. Another object is the provision of a catalyst catalytically useful with sensitive aromatics. Other objects will appear hereinafter.

These objects are accomplished by the following invention wherein the acylation of an aromatic compound having hydrogen on nuclear carbon and having a bivalent chalcogen atom of atomic weight less than 33, i. e., of integral atomic number of $8n$, $n$ being an integer not more than two, attached to two discrete carbons at least one of which is of the aromatic nucleus, is accomplished by reacting the aromatic chalcogen compound in molar excess with a carboxylic acid anhydride in the presence of a catalytic amount of perchloric acid and at a temperature of 25–200° C.

The aromatic compounds acylated in the process of this invention have an aromatic nucleus having hydrogen on nuclear carbon and have at least one nuclear carbon bonded to bivalent chalcogen of atomic weight less than 33, the molecule of the aromatic apart from the bivalent chalcogen being hydrocarbon or halogenated hydrocarbon. The chalcogen atom is attached to but two atoms and these are carbon. The aromatics thus include:

(a) Heterocyclic aromatic, i. e., five-membered ring compounds, having hydrogen on nuclear carbon and having the chalcogen as the one hetero atom and having the extranuclear valences of the nuclear carbons other than those satisfied by hydrogen satisfied by hydrocarbon and/or halogen;

(b) Carbocyclic aromatic, i. e., six-membered ring compounds having hydrogen on nuclear carbon and having a bivalent chalcogen atom attached to a carbon of the ring, the remaining valence of the chalcogen being satisfied by a hydrocarbon radical of one to six carbons.

In a preferred embodiment of this invention two to six molal proportions of a five-membered heterocyclic compound having from one to four nuclear hydrogens and containing as the hetero atom a divalent chalcogen of atomic weight less than 33 is reacted at a temperature of 25–150° C. with a molal amount of a saturated aliphatic monocarboxylic acid anhydride of from four to fourteen carbon atoms in the presence of a catalytic amount of perchloric acid, preferably 0.02 to 0.5 mole per cent of the anhydride employed, and the acylated heterocyclic compound formed is isolated.

The following examples in which parts are by weight are illustrative of the invention.

Example I

A mixture of 68 parts of furan, 51 parts of 95% acetic anhydride and 0.5 part of a 5% solution of perchloric acid in acetic acid was refluxed (at 35–40° C.) for a total of seven hours after which it was allowed to stand at room temperature for approximately seventy hours. The acid was neutralized with aqueous 5% sodium hydroxide solution and the organic layer was washed with water until neutral to litmus and dried over anhydrous magnesium sulfate. Unreacted furan and acetic anhydride were recovered by distillation at atmospheric pressure. 2-acetylfuran (22.6 parts, B. P. 70–71° C./19 mm.) was then obtained by distillation in vacuo. There was practically no residue in the still pot.

Example II

A mixture of 84 parts of thiophene, 51 parts acetic anhydride and 0.3 part of 5% solution of perchloric acid in acetic acid was refluxed (at 80–90° C.) gently for 5.5 hours and then allowed to stand at room temperature for 75 hours. The product was worked up by the procedure of Example I to give 34.8 parts (65% yield) of 2-acetylthiophene, B. P. 98.5° C./18 mm.

Example III

To a mixture of 100 parts of anisole and 51 parts acetic anhydride was added 0.3 part of a 5% solution of perchloric acid in acetic acid. The mixture after heating for four hours at 135° C. was allowed to stand at room temperature for about forty hours. After neutralization of the acid and removal of unchanged reactants by distillation, 4 parts (7.7% yield) of o-acetylanisole, B. P. 100–110° C./6 mm. and 10.2 parts (14.3% yield) of p-acetylanisole, B. P. 115–117° C./6 mm.; M. P. 35–37° C., were obtained.

The importance of the chalcogen requirement in the acylatable aromatic compounds of this invention, i. e., aromatic compounds which are capable of being ring acylated by the process of the invention, is illustrated by the fact that benzene (78 parts of thiophene-free), in contrast to anisole, was found not to react when treated under similar conditions with acetic anhydride (51 parts) in the presence of perchloric acid (0.03 mole per cent based on the acetic anhydride). When phenol, a chalcogen-bearing aromatic compound, but not an ether, was reacted with acetic anhydride in the presence of perchloric acid, the product was almost exclusively phenyl acetate, i. e., ring acetylation took place if at all, to a very minor extent.

The aromatic compounds acylated in the process of this invention are aromatic ethers with the ether linkage, oxy- or thio-, either an annular member of the aromatic nucleus or attached to annular carbon thereof. These aromatic ethers have hydrogen on annular or nuclear carbon.

The invention is then generic to aromatic compounds having hydrogen on nuclear, i. e., aromatic carbon, having a bivalent chalcogen atom attached by at least one of its valences to nuclear carbon and having any remaining valence attached to a monovalent hydrocarbon radical of one to six carbons, and having any remaining valence of the nucleus satisfied by hydrocarbon and/or halogen including phenetole, phenyl amyl ether, phenyl hexyl ether, diphenyl ether, phenyl cyclohexyl ether, naphthyl methyl ether, phenyl methyl sulfide, benzofuran, benzothiophene, and their hydrocarbon and halogen substituted derivatives, e. g., 2-methylfuran, 2,5-dimethylfuran, 2-methyl-5-phenylfuran, 2-methylthiophene, 3-methylthiophene, 2,3- and 3,5-dimethylthiophene, 2-phenylthiophene, dithienylmethane, 2-bromofuran, 2-chlorothiophene, 2-bromothiophene, p-chloroanisole, p-bromophenetole, p-chlorophenyl methyl sulfide, etc. Of these, the preferred, because of availability and good reactivity, are monocyclic chalcogen-containing aromatic compounds, which have five to six annular atoms in the aromatic ring, have hydrogen on annular carbon, have, attached to at least one annular carbon atom, a chalcogen, and are, apart from the chalcogen, hydrocarbon. The most preferred class are those wherein the aromatic compound has hydrogen on nuclear carbon, has a bivalent chalcogen of atomic number $8n$, where $n$ is an integer not greater than two, bonded to at least one carbon of the nucleus, any valence of the chalcogen not bonded to nuclear carbon being satisfied by a monovalent hydrocarbon radical of one to six carbons, and is, apart from bivalent chalcogen, hydrocarbon.

In the process of this invention carboxylic acid anhydrides, i. e., compounds having the characteristic grouping

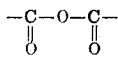

in general are suitable as acylating agents including propionic, butyric, pentanoic, hexanoic, heptanoic, hexahydrobenzoic, benzoic, phthalic, succinic, adipic, and maleic acid anhydrides and they can be substituted for the acetic anhydride of the examples for the production of the corresponding acyl derivatives. Because of their suitable reactivity and availability, it is preferred, however, to employ saturated monocarboxylic anhydrides, $(RCO)_2O$, R being a saturated hydrocarbon radical, aliphatic in character, i. e., anhydrides of alkanoic and cycloalkanoic acids, said anhydrides containing from four to fourteen carbon atoms.

In the process of this invention the molal ratio of acylatable aromatic compound to carboxylic acid anhydride can vary from about 1:1 to 20:1. Preferably there should be a molal excess of the aromatic compound being acylated. The molal ratio most preferred is within the range of 2:1 to 6:1 since, in general, with these ratios the ring acylation reaction proceeds most advantageously.

The perchloric acid catalyst should be employed in an amount of at least 0.005 mole per cent based on the molal amount of the anhydride used. In general, not more than one mole per cent of the catalyst will be employed, the preferred amount being from 0.02 to 0.5 mole per cent.

The temperature at which the reaction is carried out can be from 25–200° C., the particular temperature depending on the sensitivity of the particular reagents being processed. However, a temperature of 25–150° C. is preferred since the reaction proceeds suitably at this range. The time of reaction can likewise vary widely, from one to as much as 80 hours or more, depending to a large extent on the temperature. At the temperature within the preferred range, two to twenty hours reaction time is usually sufficient for good results.

The process of this invention is therefore suitable for the preparation of acyl heterocyclics and other acyl aromatics wherein the aromatic has bivalent chalcogen on ring carbon and is, preferably, apart from the bivalent chalcogen, hydrocarbon, including 2-propionylfuran, 2-butyrylfuran, 2-pentanoylfuran, 2-benzoylfuran, 2-acetyl-5-chlorofuran, 2-hexanoylfuran, 2-decanoylfuran, 2-benzoylthiophene, 2-hexahydrobenzoylthiophene, 2-isobutyrylthiophene, 2-pentanoylthiophene, 2-acetyl-5-bromothiophene, 2-acetyl-3,5-dimethylthiophene, 2-acetyl-5-ethylthiophene, 2-acetylphenyl methyl sulfide, 4-acetylphenyl methyl sulfide, 3-bromo-4-methoxypropiophenone, 2-pentanoylanisole, etc.

The acylated products of this invention are useful as intermediates for pharmaceuticals and dyestuffs, and as perfume ingredients, plant growth regulants and insecticides.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of acetylanisole wherein acetic anhydride is reacted with from one to twenty moles, per mole of acetic anhydride, of anisole at a temperature within the range 25–200° C. in the presence of 0.02 to 0.5 mole per cent, based on the anhydride, of perchloric acid.

2. A process for the preparation of acetylfuran wherein acetic anhydride is reacted with from one to twenty moles, per mole of acetic anhydride, of furan at a temperature within the range 25–200° C. in the presence of 0.02 to 0.5 mole per cent, based on the anhydride, of perchloric acid.

3. A process for the preparation of acetylthiophene wherein acetic anhydride is reacted with from one to twenty moles, per mole of acetic anhydride, of thiophene at a temperature within the range 25–200° C. in the presence of 0.02 to 0.5 mole per cent, based on the anhydride, of perchloric acid.

4. A process for the preparation of acetyl derivatives of five-membered aromatic heterocyclic compounds having as the hetero atom a bivalent chalcogen of atomic number $8n$, where $n$ is an integer and not more than 2, having hydrogen on nuclear carbon and containing only the chalcogen, carbon, and hydrogen wherein acetic anhydride is reacted with from one to twenty moles, per mole of anhydride, of said aromatic heterocyclic compound at a temperature within the range 25–200° C. in the presence of 0.02 to 0.5 mole per cent, based on the anhydride, of perchloric acid.

5. A process for the preparation of ring acylated aromatic carbocyclic compounds wherein acetic anhydride is reacted with from one to twenty moles, per mole of anhydride, of an aromatic carbocyclic compound having hydrogen on nuclear carbon, having on nuclear carbon a substituent XR wherein X is a bivalent chalcogen of atomic number $8n$, $n$ being an integer not greater than 2, and R is a monovalent hydrocarbon radical of one to six carbons, and containing only carbon, hydrogen and the chalcogen at a temperature within the range 25–200° C. in the presence of 0.02 to 0.5 mole per cent, based on the anhydride, of perchloric acid.

6. A process for the preparation of ring acylated aromatic compounds wherein a carboxylic acid anhydride is reacted with from one to twenty moles, per mole of anhydride, of an aromatic ether wherein there is hydrogen on nuclear carbon, the ether linkage, i. e., bridging radical, is a bivalent chalcogen of atomic number $8n$ and $n$ is an integer not greater than 2, the chalcogen is attached to at least one of the nuclear carbons, and the molecule contains only hydrogen, the one chalcogen, and carbon, preferably not more than 12, at a temperature within the range 25–200° C. in the presence of 0.02 to 0.5 mole per cent, based on the anhydride, of perchloric acid.

7. A process for the preparation of ring acylated aromatic compounds wherein a carboxylic acid anhydride is reacted at a temperature within the range 25–150° C. and in the presence of 0.02 to 0.5 mole per cent, based on the anhydride, of perchloric acid with an aromatic compound containing carbon, hydrogen and bivalent chalcogen of atomic number $8n$, wherein $n$ is an integer not greater than 2, having hydrogen on nuclear carbon, having the chalcogen attached to two separate carbons at least one of which is a nuclear carbon.

8. A process for the preparation of ring acylated aromatic compounds wherein a carboxylic acid anhydride is reacted at a temperature within the range 25–150° C. and in the presence of 0.02 to 0.5 mole per cent, based on the anhydride, of perchloric acid with an aromatic compound having hydrogen on nuclear carbon, containing one bivalent chalcogen of atomic number $8n$, where $n$ is an integer not greater than 2, bonded by one valence to nuclear carbon and by the other valence to carbon, any extranuclear valence not satisfied by hydrogen and the chalcogen being satisfied by hydrocarbon or halogen radicals.

ROBERT EVERETT FOSTER.

REFERENCES CITED

The following references are of record in the file of this patent:

UNITED STATES PATENTS

| Number | Name | Date |
| --- | --- | --- |
| 2,432,991 | Hartough et al. | Dec. 23, 1947 |

OTHER REFERENCES

Chem. Ab. vol 33, 1939, page 8008[5].
Chem. Ab. vol. 40, 1946, page 7223[2].
"Catalysts" by Berkman, 1940, page 944.